DOUGLAS H. MORGAN
INVENTOR
WHANN & McMANIGAL
Attorneys for Applicant
BY

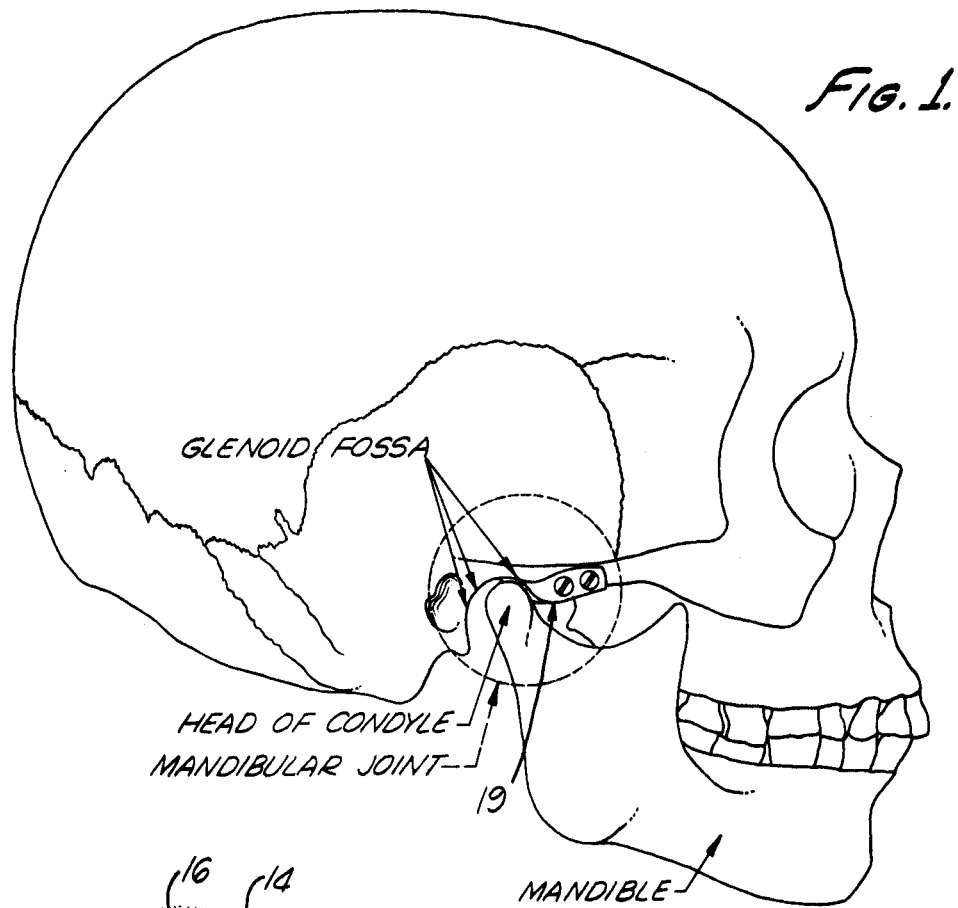
Fig. 1.
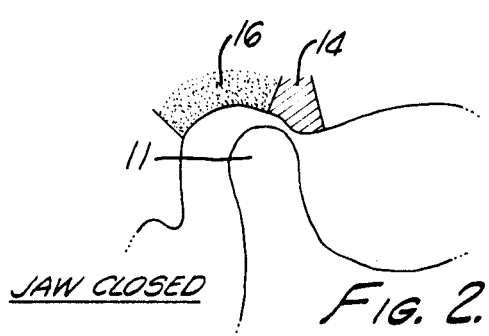
Fig. 2. JAW CLOSED
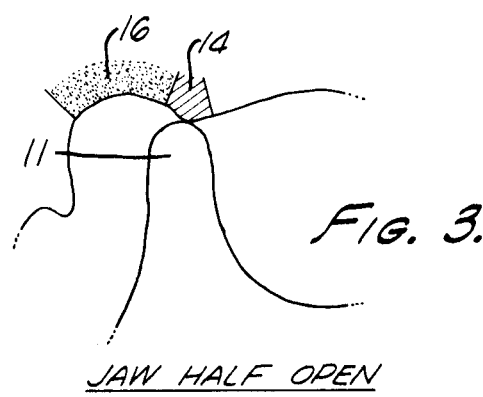
Fig. 3. JAW HALF OPEN
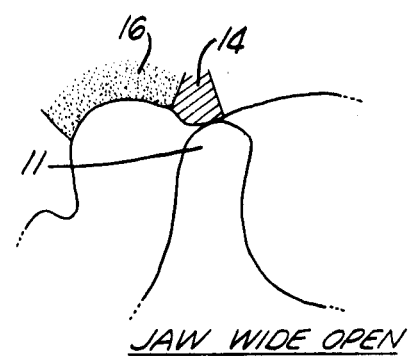
Fig. 4. JAW WIDE OPEN
DOUGLAS H. MORGAN
INVENTOR
WHANN & McMANIGAL
BY Attorneys for Applicant May 25, 1971   D. H. MORGAN   3,579,643
ARTIFICIAL ARTICULAR EMINENCE FOR THE MANDIBULAR JOINT
Filed Dec. 12, 1968   3 Sheets-Sheet 2

May 25, 1971   D. H. MORGAN   3,579,643
ARTIFICIAL ARTICULAR EMINENCE FOR THE MANDIBULAR JOINT
Filed Dec. 12, 1968   3 Sheets-Sheet 3

DOUGLAS H. MORGAN
INVENTOR
WHANN & McMANIGAL
Attorneys for Applicant
BY

United States Patent Office 3,579,643
Patented May 25, 1971

3,579,643
ARTIFICIAL ARTICULAR EMINENCE FOR THE MANDIBULAR JOINT
Douglas H. Morgan, 1700 Lila Lane, La Canada, Calif. 91011
Filed Dec. 12, 1968, Ser. No. 783,334
Int. Cl. A61f 1/24
U.S. Cl. 3—1                                                    6 Claims

ABSTRACT OF THE DISCLOSURE

The present invention relates to the specialized field of dentistry known as oral surgery and particularly to an artificial articular eminence for the cure of disorders or dysfunctions of the mandibular joint. The artificial articular eminence of the present invention is surgically applied and provides an artificial surface for the condylar head of the mandible to contact and slide upon in opening and closing the jaw.

SUMMARY OF THE INVENTION

The present invention relates to disorders or dysfunctions of the mandibular joint which consists of the glenoid fossa the condylar head of the mandible, the mandibular disc and muscle attachments. The two bony segments, the glenoid fossa and the head of the condyle are separated by the mandibular disc which acts as a cushion. The mandibular disc is in an enclosed capsule, which contains synovial fluid adjacent to the head of the condyle, meniscus cartilage and synovial fluid adjacent to the glenoid fossa. Any disruption of the mandibular disc whether in the meniscus cartilage or with the synovial fluid can result in various symptoms and pathosis: The symptoms can include: pain in the mandibular joint, inability to open the mouth, pain on opening or closing the mouth, ringing in the ears, vertigo, and pain in the neck, head and shoulders. The Pathosis can include perforation or maceration of the mandibular disc, or fibrous or bony ankylosis which results in partial or total fusion of the two bony segments of mandibular joint.

Heretofore surgical corrections of disorders or dysfunctions of the mandibular joint included covering the head of the condyle with a metal cup, replacing the mandibular disc with fascia or cartilage, or placing tantalum foil, cast vitallium or stainless steel into the glenoid fossa.

Recently it has been proposed (U.S. Pat. No. 3,178,-728) that disorders or dysfunctions of the mandibular joint can be successfully treated by surgically applying a prosthesis for the mandibular joint which comprises a plate of physiologically inert material and anatomically contoured to fit within the glenoid fossa (mandibular fossa portion of the glenoid fossa) and to overlay the articular eminence.

A prosthesis which is sized and shaped to fit or cover the entire glenoid fossa including a part of the tympanic bone, the temporotympanic fissure, the mandibular fossa and the articular eminence possesses a number of disadvantages. The presence of the prosthesis between the head of the condyle and the mandibular fossa portion of the glenoid fossa will disturb the normal relationship between the head of the condyle and mandibular fossa and will result in disruption of normal jaw function or alteration of the occlusion or bite.

The size and contour of the glenoid fossa region vary from patient to patient. For surgical application of a prosthesis sized and contoured to fit within the mandibular fossa and to overlay the articular eminence, approximately ten to fifteen prosthesis of differing sizes and contours are required. The time required to surgically apply a prosthesis which is of such a size and contour as to fit within the mandibular fossa and overlay the articular eminence is of substantial duration.

I have discovered that the mandibular joint constitutes what may be termed a non-stress bearing joint. When the jaw is at rest with the teeth lightly in contact the head of the condyle does not contact the mandibular fossa portion of the glenoid fossa. Nor does it exert pressure against the mandibular fossa. When the jaw is articulated, the head of the condyle contacts, exerts pressure upon and slides upon the articular eminence only.

The present invention provides a novel artificial articular eminence for the mandibular joint and overcomes the disadvantages of a prosthesis covering the mandibular fossa and the articular eminence. The artificial articular eminence of the present invention constitutes a layer of physiologically inert material which fits upon the articular eminence portion of the glenoid fossa. The artificial articular eminence is provided with a rim extending anteriorly with a lateral aspect. By providing holes in the rim, the artificial articular eminence may be screwed to the zygoma with suitable screws.

It is an object of the present invention to provide an artificial articular eminence which covers only the area of the mandibular joint where articulation or function takes place.

It is a further object of the present invention to provide an artificial articular eminence which will not disturb normal jaw function or alter the occlusion or bite.

It is a further object of the present invention to provide an artificial articular eminence which can be surgically applied in a short period of time.

It is a further object of the present invention to provide one artificial eminence which will fit all patients.

BRIEF DESCRIPTION OF THE DRAWINGS

FIG. 1 is a side elevational view of a human skull showing the artificial articular eminence of the present invention in place.

FIG. 2 is a side elevational view of the mandibular joint, with the mandibular disc removed, showing the relationship between the head of the condyle and glenoid fossa when the jaw is closed with teeth lightly touching.

FIG. 3 is a side elevational view of the mandibular joint, with the mandibular disc removed, showing the relationship between the head of the condyle and the glenoid fossa when the jaw is half open.

FIG. 4 is a side elevational view of the mandibular joint, with the mandibular disc removed, showing the relationship between the head of the condyle and the glenoid fossa when the jaw is wide open.

DESCRIPTION OF THE PREFERRED EMBODIMENT

Figure 5:
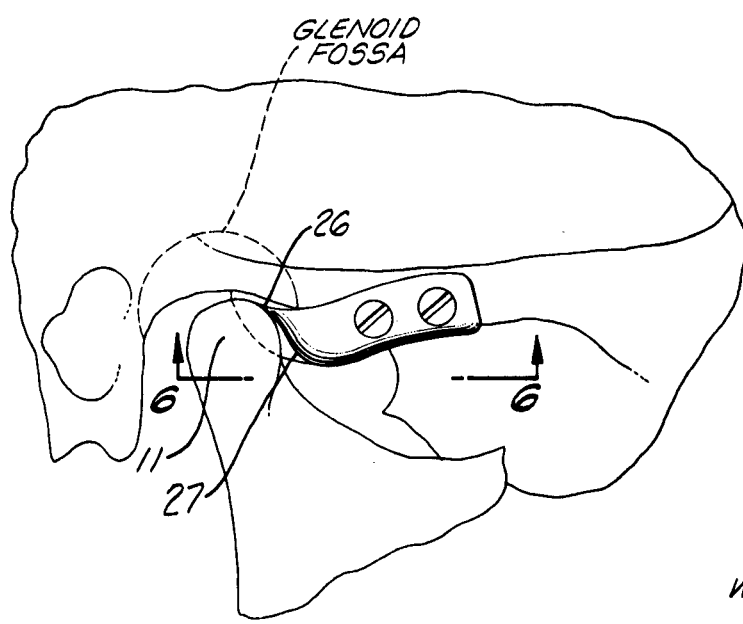
FIG. 5 is a side elevational view of the mandibular joint with the artificial articular eminence of the present invention in place showing the relationship of the head of the condyle, the mandibular fossa and the artificial articular eminence.
Figure 7:
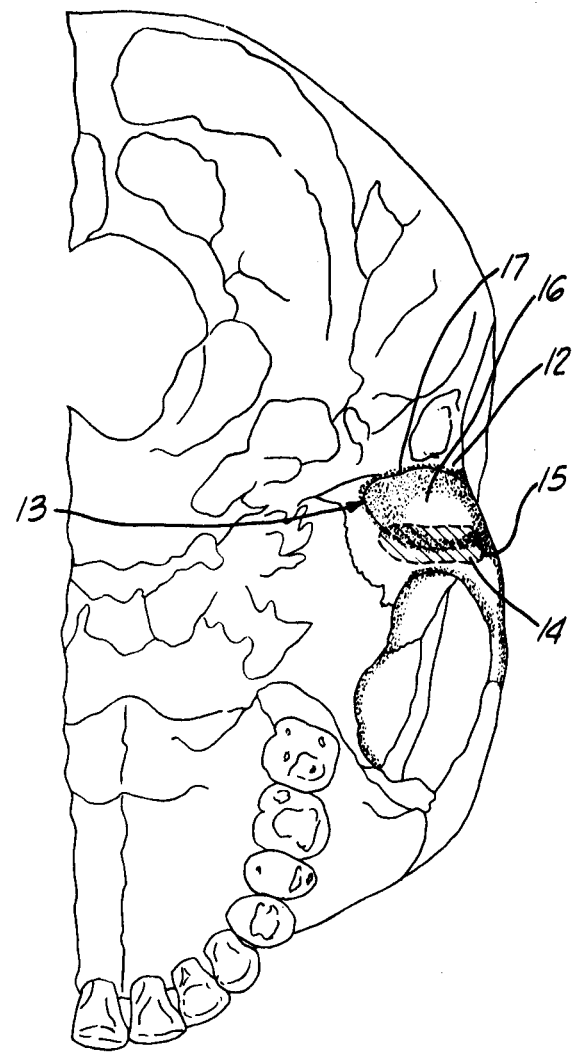
FIG. 7 is a bottom view of the right half of a human skull unobstructed by the mandible showing the mandibular fossa and articular eminence portions of the glenoid fossa.

Referring to FIGS. 1, 5 and 7, the present invention is concerned with disorders or dysfunctions of the mandibular joint. The mandibular joint consists of the head of the condyle 11 of the mandible, the mandibular disc (not shown), muscle attachments (not shown), capsular ligament (not shown) and the glenoid fossa. As illustrated in FIGS. 1 and 5 the head of the condyle 11 extends into but does not contact the concave region of the glenoid fossa. Referring to FIG. 7, the glenoid fossa is defined by the tympanic bone 12 (rearward boundary), the medial glenoid ridge 13 (inward boundary), the articular eminence 14 (forward boundary) and the zygion 15 (outward boundary). The tympanic bone 12, the medial glenoid ridge 13, the articular eminence 14 and zygion 15 surround and define the mandibular fossa 16 which is the concave region of the glenoid fossa. At the rearward boundary of the glenoid fossa, the mandibular fossa 16 and the tympanic bone 12 are joined at the temporo-tympanic fissure 17. The aspect of the glenoid fossa with which the present invention is particularly concerned is the forward aspect which is formed by the articular eminence 14. The articular eminence 14 is somewhat S-shaped, the rearward aspect being slightly concave and the forward aspect being slightly convex.

There are three unique features of the mandibular joint; it is a non-stress and stress bearing joint, depending on the relationship of the head of the condyle to the artificial eminence; it is not simply a hinge, but a sliding hinge; and it is a bilateral joint, i.e., both the right and left sides should act in symmetry. Referring to FIGS. 2, 3 and 4 the speckled portions illustrate the mandibular fossa 16 and the cross-hatched portions illustrate the articular eminence 14. Referring to FIG. 2, when the jaw is closed the head of the condyle 11 does not contact the mandibular fossa 16 and may or may not, depending on the individual, contact the articular eminence 14 Referring to FIG. 3, as the jaw is articulated from closed position to half open position, the head of the condyle 11 contacts, exerts pressure against and slides forwardly upon the articular eminence 14. No portion of the head of the condyle 11 contracts or exerts pressure against the mandibular fossa 16. Referring to FIG. 4, as the jaw is articulated from half open position to wide open position, the head of the condyle 11 contacts, exerts pressure against and slides forwardly upon the articular eminence 14.

The artificial articular eminence of the present invention is based on the discovery that greatly suprising and unobvious coaction may be obtained by covering only the articular eminence portion of the mandibular joint. The artificial articular eminence of the present invention is illustrated in position in FIGS. 1, 5 and 8 and in detail in FIG. 6. It consists of a plate of inert metal, physiologically compatible with body tissue, contoured to overlay the articular eminence. As illustrated in FIGS. 1 and 5, the artificial articular eminence provides a stress bearing sliding surface in the same manner as a healthy mandibular disc. Because the artificial articular eminence overlays only the articular eminence portion of the glenoid fossa, I have discovered in treating true fibrous ankylosis that it is usually better to leave the mandibular disc, or as much of it as remians, intact.

Figure 6:
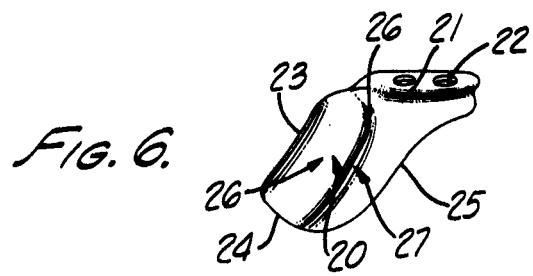
FIG. 6 is a section taken on the line 6—6 of FIG. 5, unobstructed by the head of the condyle.
Figure 8:
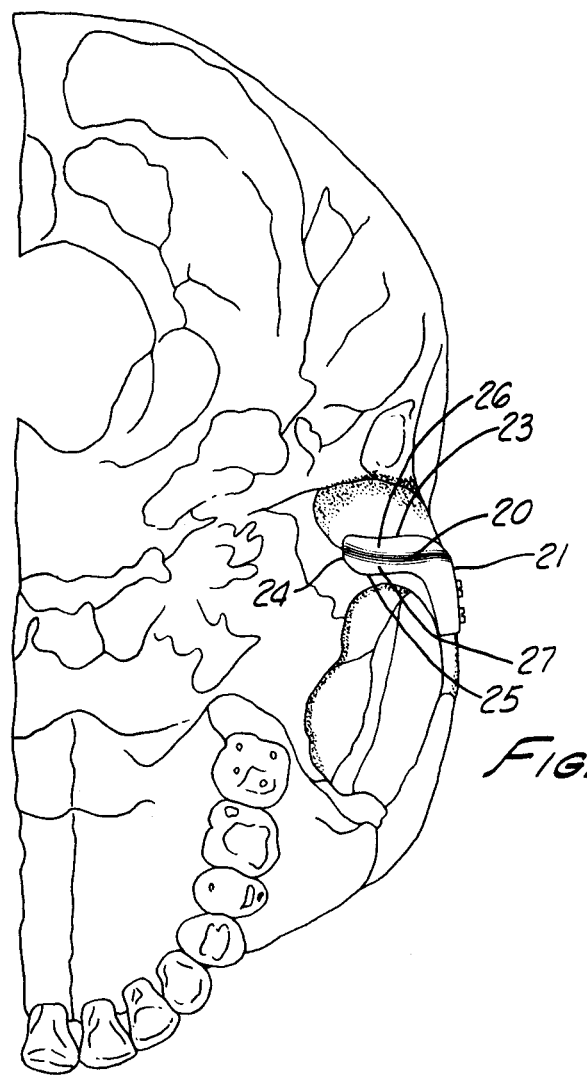
FIG. 8 is a bottom view of the right half of a human skull unobstructed by the mandible showing the artificial articular eminence of the present invention in place.

Referring to FIGS. 5, 6 and 8, the present invention consists of an anatomically contoured plate of metal approximately 1/64" in thickness, which includes an articular eminence portion 20, which is approximately 3/4" long by 1/4" wide and a zygomatic portion 21 which is approximately 1/2" long by 1/4" wide. The zygomatic portion 21 is sized and contoured to overlay a portion of the zygion 15. The zygomatic portion 21 is provided with one or more holes 22 approximately 1/16" in diameter to receive either 5 mm. or 7 mm. screws for the purpose of securing the artificial articular eminence in place.

The articular eminence portion 20 of the artificial articular eminence is defined by a rearward edge 23, an inward edge 24, a forward edge 25 and an outward portion 26. As illustrated in FIGS. 7 and 8, the articular eminence portion is sized and contoured to overlay only the articular eminence 14 of the glenoid fossa. Because the artificial articular eminence does not overlay any portion of the mandibular fossa 17 the position of the head of the condyle in relation to the glenoid fossa is not affected and consequently there is no disruption of the occlusion or bite.

As illustrated in FIGS. 5, 6 and 8 the rearward portion 26 of the articular eminence portion 20 is slightly concave and the forward portion 27 is slightly convex to define the actual contour of the articular eminence. Referring particularly to FIG. 5, in articulating the jaw from closed position to open position the head of the condyle 11 moves forwardly first on the concave surface 26 and then on the convex surface 27. The surfaces 26 and 27 should be polished so as to present nonfrictional surfaces for the head of the condyle 11 to slide upon.

The artificial articular eminence may be fabricated of any inert material which is physiologically compatible with body tissue, i.e., tantalum, vitallium, stainless steel, polyethylene, Teflon, acrylic or silastic.

The artificial articular eminence of the present invention has been used successfully in six patients to eliminate various pain symptoms as well as limitations of mandibular movement. In fabricating the artificial articular eminence I obtained 50 human skulls and had impressions made of the glenoid fossa of the right and left side of each of them. Dies were made from the impressions. From the dies, cast metal artificial articular eminences were made to fit each skull. By analyzing all 100 artificial articular eminences I contoured a single right and a single left artificial articular eminence which would fit all 50 skulls in an accurate manner. The fact that the artificial articular eminence overlays the articular eminence and does not overlay or contact the mandibular fossa is the reason why one right and left universal appliance is sufficient, although several other forms could be used if the surgeon wished. This is also the reason why the time for surgically applying the artificial articular eminence of the present invention is substantially reduced.

I claim:

1. An artificial articular eminence for the articular eminence portion of the mandibular joint fabricated of inert material which is physiologically compatible with body tissue, comprising:
    (a) a thin sheet-like element contoured to overlay only the articular eminence portion of the glenoid fossa; and
    (b) means for securing the artificial articular eminence to the articular eminence.

2. An artificial articular eminence for the articular eminence portion of the mandibular joint fabricated of inert material which is physiologically compatible with body tissue, comprising:
    (a) a first portion contoured to fit and overlay only the articular eminence portion of the mandibular joint;
    (b) a projecting rim extending substantially perpendicular to said first portion contoured to overlay a portion of the zygomatic portion of the mandibular joint; and
    (c) means for securing the artificial articular eminence to the skull with said first portion overlying only the articular eminence and the projecting rim overlying the zygoma.

3. An artificial articular eminence as defined in claim 2, in which the projecting rim is provided with at least one hole to receive at least one screw for securing the artificial articular eminence in place.

4. An artificial articular eminence as defined in claim 2 in which the outer surface of said first portion is highly polished.

5. An artificial articular eminence for the articular eminence portion of the glenoid fossa portion of the mandibular joint, fabricated of inert material which is physiologically compatible with body tissue, consisting of:
    (a) a thin sheet-like portion contoured to fit and overlay only the articular eminence, the outer surface thereof being engageable by the head of the condyle, the head of the condyle being slidable forwardly along said portion as the jaws open, said artificial articular eminence being so shaped and adapted to be positioned relative to the glenoid fossa portion of the mandibular joint that it does not destroy the normal relationship of the head of the condyle to the glenoid fossa and consequently does not disturb the bite; and (b) means for securing said portion to the skull in a position in which it overlays the articular eminence portion of glenoid fossa portion of the mandibular joint.

6. An artificial articular eminence for the articular eminence portion of the glenoid fossa portion of the mandibular joint, fabricated of inert material which is physiologically compatible with body tissue, consisting of:

(a) a thin sheet-like portion contoured to fit and overlay only the articular eminence, the outer surface thereof being engageable by the head of the condyle, the head of the condyle being slidable forwardly along said portion as the jaws open, said artificial articular eminence being so shaped and adapted to be positioned relative to the glenoid fossa portion of the mandibular joint that it does not destroy the normal relationship of the head of the condyle to the glenoid fossa and consequently does not disturb the bite;

(b) a projecting rim extending from said first mentioned portion which is adapted to overlay a part of the zygoma; and (c) means for securing said projecting rim to the zygoma whereby the artificial articular eminence is adapted to be secured to the skull with the first mentioned portion overlying the articular eminence and the projecting rim overlying the zygoma.

References Cited
UNITED STATES PATENTS 3,178,728   4/1965   ---------------------- 3—1

WILLIAM E. KAMM, Primary Examiner

R. L. FRINKS, Assistant Examiner

U.S. Cl. X.R.

128—92C